Feb. 26, 1963  
J. CLARK  
3,078,709  
METHOD OF, AND APPARATUS FOR, DETERMINING  
CHARACTERISTICS OF FLOWING FLUIDS  
Filed March 6, 1958  
4 Sheets-Sheet 1

JAMES CLARK  
INVENTOR.

BY  
*Herschel C. Omohundro*  
ATTORNEY

Feb. 26, 1963 J. CLARK 3,078,709
METHOD OF, AND APPARATUS FOR, DETERMINING
CHARACTERISTICS OF FLOWING FLUIDS
Filed March 6, 1958 4 Sheets-Sheet 2

JAMES CLARK
INVENTOR.

BY
Herschel C. Omohundro
ATTORNEY

Feb. 26, 1963 J. CLARK 3,078,709
METHOD OF, AND APPARATUS FOR, DETERMINING
CHARACTERISTICS OF FLOWING FLUIDS
Filed March 6, 1958 4 Sheets-Sheet 4

INVENTOR,
JAMES CLARK
BY
Herschel C. Omohundro
ATTORNEY

United States Patent Office 3,078,709
Patented Feb. 26, 1963

3,078,709
METHOD OF, AND APPARATUS FOR, DETERMINING CHARACTERISTICS OF FLOWING FLUIDS
James Clark, Scottsdale, Ariz., assignor to The Garrett Corporation, Los Angeles, Calif., a corporation of California
Filed Mar. 6, 1958, Ser. No. 719,593
4 Claims. (Cl. 73—53)

This invention relates to methods of testing for, detecting, measuring and indicating variations in fluids and their flow, and to equipment for carrying out such methods.

I have discovered a method and apparatus for developing an electrical signal representing the presence, magnitude, and motion in a fluid of electrically-neutral anomalies like flow irregularities, discontinuities, or impurities in solid, liquid or gaseous form impinging upon, or proximately related to a grid or electrode made of electrically-conductive material.

It is an object of this invention to provide a method of and apparatus for detecting, measuring and indicating mobile anomalies in fluids.

Another object of this invention is to provide a method of and apparatus for producing relative motion between a fluid to be tested and means forming a conducting path for an electric current whereby predetermined characteristics of the fluid and/or variations therein will result in representative electrical signals, the apparatus including means for amplifying such signal and translating it into indicia which may be compared with suitable known standards of measurement.

Still another object is to provide apparatus for carrying out a new and improved method of testing fluids for variations in the characteristics and/or flow thereof, such apparatus having sensing means to be disposed adjacent to or engaged by the fluid for carrying signal voltages developed upon the occurrence of by relative movement between anomalies and the sensing means, amplifying and signal translating, measuring and recording means completing the apparatus.

A problem long recognized by hydraulic engineers and fluid dynamicists is one of cavitation, or the formation of vapor bubbles, in liquids which are being transferred from one location to another by pumping operations. This problem is particularly evident in the movement of fuel and/or oxidizers from storage tanks to combustion devices. It is aggravated by reduced ambient pressures, and also by the use of fluids which are normally gaseous in character but have been liquefied to facilitate transportation and storage. When cavitation occurs, serious difficulties and possible power failures in engines or other combustion devices may be encountered.

As exemplified herein, the invention has utility in a method of and apparatus for measuring the flow of and/or detecting the presence of gas bubbles, or cavitation, and other anomalies in liquids.

Another object of this invention is to provide a method of and apparatus for detecting and measuring cavitation and other changes in the physical characteristics of a flowing liquid, so that timely steps may be taken to correct or eliminate the causes thereof and prevent troubles resulting therefrom.

Another object of this invention is to provide apparatus for detecting and measuring cavitation and other anomalies in a fluid, such apparatus utilizing certain inherent characteristics of the liquids being transferred to render an indication which is a direct function of the cavitation or other anomalies.

A further object of the invention is to provide cavitation detecting and measuring apparatus having a grid which is adapted to be placed in a liquid flow conduit and is formed with spaced elements relative to which the liquid in the conduit moves, amplifying means being connected with the spaced elements to increase the magnitude of the signal voltage produced in the elements of the grid when cavitation bubbles or other anomalies are present therein, the amplified signals being supplied to a cathode-ray oscilloscope or other signal translating or recording means.

A still further object of the invention is to provide cavitation detecting and measuring apparatus of the general type set forth in the preceding paragraph, but modified by employing an alternating current amplifier so that the signal voltage caused by the movement of bubbles past the elements of the grid will produce a more obvious signal on the oscilloscope.

A further object is to provide apparatus for detecting cavitation in liquids flowing through a conduit, the apparatus having a plurality of electrodes spaced in circular order around the interior of the conduit and another electrode disposed centrally of the conduit, the electrodes being connected to respective amplifiers which are in turn connected to synchronized switches in circuit with a polar scanning oscilloscope. This apparatus causes an electron beam to be swept radially of and around the cathode-ray screen, the cavitation bubbles varying in varying signals on the electrodes and thereby causing beam intensification or other observable changes on the screen to indicate the size and location of the bubbles.

Other objects and advantages of the invention will be apparent from the following description and the accompanying drawings in which the invention has been illustrated in several forms. In the drawings.

Figure 1:
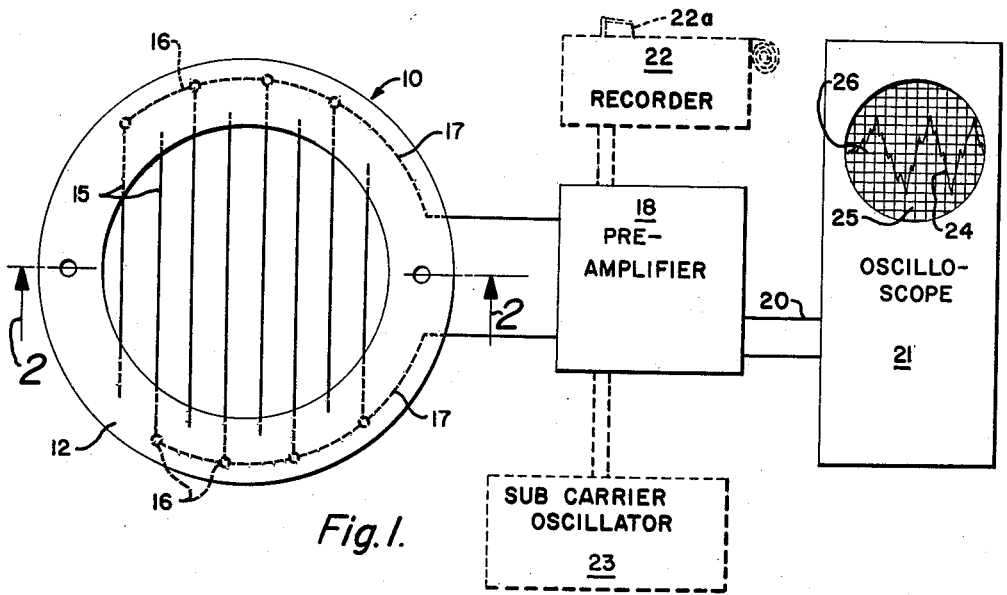
FIGURE 1 is a diagrammatic view of one form of apparatus embodying the invention.
Figure 2:
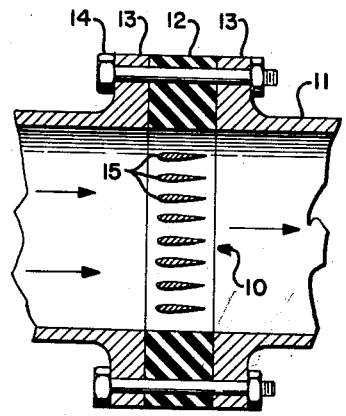
FIG. 2 is a detailed horizontal sectional view taken through a portion of the apparatus shown in FIG. 1 on the plane indicated by the line 2—2 of FIG. 1.

Referring more particularly to the drawings, the apparatus shown in FIGS. 1 and 2 constitutes one form of the basic apparatus for carrying out the invention. This basic apparatus includes a grid assembly 10, which, as shown in FIG. 2, is positioned in a conduit 11 through which the liquids to be tested flow. The grid 10 comprises a dielectric or insulating ring 12, which is clamped between flanges 13 on parts of the conduit 11, the flanges and the ring receiving bolts or other suitable fastening elements 14 employed to maintain a fluid-tight joint between the ring and the conduit sections. The ring 12 is provided with a plurality of spaced electrode elements 15, alternate elements being connected as at 16 to leads 17.

In the form of the invention illustrated in FIGS. 1 and 2, the electrodes 15 are streamlined in cross-section to impart as little interference as possible to the flow of fluid therebetween. Changing voltages are developed in these electrodes or current-conducting elements whenever anomalies move through the liquids present in the conduit. Such voltages are varied when the flowing fluids are disturbed by bubbles of cavitation. When the fluid is disturbed by the bubles moving adjacent the electrodes, a corresponding electromotive force is developed in the electrodes, this force being transmitted through the leads 17 to pre-amplifier 18 forming a part of the system. Amplifier 18 may be of any suitable type, that is, an alternating or direct current amplifier in which the signal developed in the electrodes may be sufficiently increased in magnitude. In the first form of the invention illustrated, this amplified signal is transmitted by leads 20 to a signal translating device 21, which may also be of any suitable type, an oscilloscope being indicated by full lines in FIG. 1 while a recorder 22 and frequency modulated subcarrier oscillator 23 are indicated by dotted lines in the same figure. Any one or all of these devices may be employed, as desired. The recorder 22, having a movable stylus, may be employed to produce a printed record, such as a trace on graph paper, showing the presence of the amplified signal and one or more characteristics thereof, such as the magnitude or strength of the fluctuations. The oscillator 23 may be used to translate the signal for a telemetering or other transmitting instrument by which the signal may be sent to a remote location.

Figure 7:
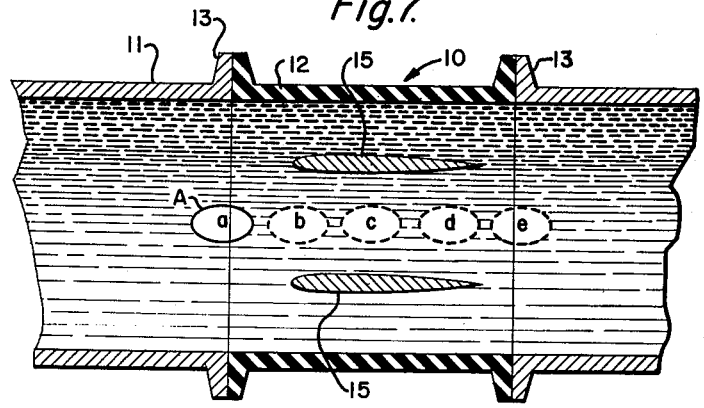
FIG. 7 is a longitudinal sectional view of a liquid conduit with a grid therein and the representation of a bubble in various stages of movement relative to the grid.
Figure 8:
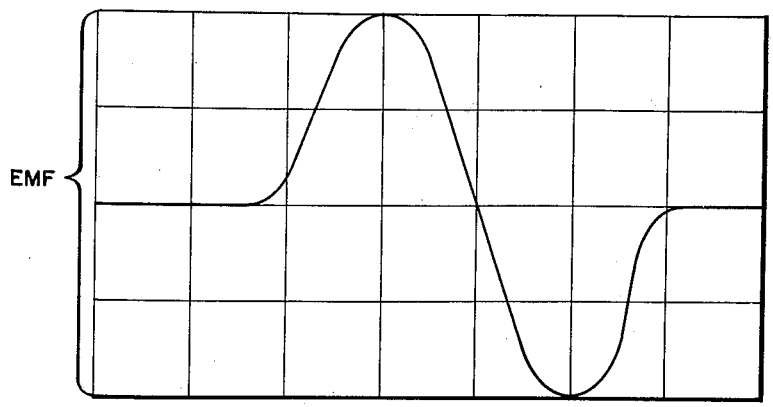
FIG. 8 is a similar view illustrating the electromotive force, or signal, developed in the elements of the grid upon the passage of a bubble.

FIGS. 7 and 8 of the drawings have been provided to illustrate an apparent relation between the movement of a single bubble relative to the grid and the resulting signal impressed thereon. In FIG. 7 a bubble A is shown in various stages, a, b, c, d, and e, of movement relative to the grid electrodes 15; FIG. 8 illustrates roughly an idealized signal, as traced, for example, on an oscilloscope screen, excited by the movement of the bubble A, the trace being correlated with the positions a, b, c, d and e of FIG. 7.

It will be observed from the foregoing that as fluid containing bubbles flows through the conduit 11, the electrical status of the grid will be changed, causing electric signals effectively to be developed in its spaced electrodes. These signals will then be amplified and transmitted to a translating device 21, 22 or 23, to impart the desired information to an operator. As the electromotive forces developed in the electrodes of the grid vary, the pattern of the trace produced on the oscilloscope screen, or in the output records of the other translating devices, will change. A wavy, serrated line 24 has been drawn on the screen 25 of the oscilloscope 21 to represent one pattern which may be caused by cavitation in the liquid flowing through the conduit 11. The degree of lateral deflection of the line 24 with respect to the base line 26 will indicate the magnitude of the cavitation.

Numerous forms of grid structures will serve in the practice of the methods embodying the invention. For example, FIGS. 3, 4, 5, and 6 show modified forms of grids and associated apparatus for carrying out the invention.

Figure 3:
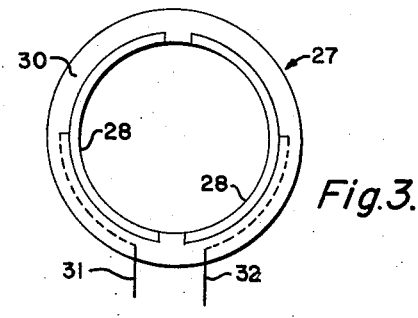
FIGS. 3 and 4 are modified forms of grids which may be used in the apparatus shown in FIG. 1.

In FIG. 3, the sensing grid 27 has a pair of arcuate electrodes 28 embedded in the wall of the conduit section 30. A surface of each electrode forms a continuation of the conduit wall so that no intereference will be offered to the flow of liquid through the pipe. The ends of the electrodes are separated by portions of the conduit section 30, which is composed of suitable material to insulate the electrodes from one another. Leads 31 and 32 extend from the electrodes for connection to the amplifier, as in the circuit shown in FIG. 1.

Figure 4:
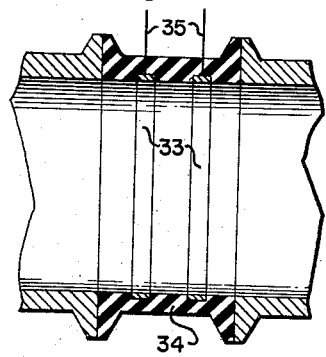

In FIG. 4, the grid is composed of a plurality of rings 33 embedded in a dielectric tube section 34 at longitudinally spaced locations. Leads 35 extend from the rings 33 to conduct signals developed therein by the liquid and bubbles flowing past the rings, to the amplifying and translating apparatus as in the form of the invention shown in FIG. 1.

Figure 6:
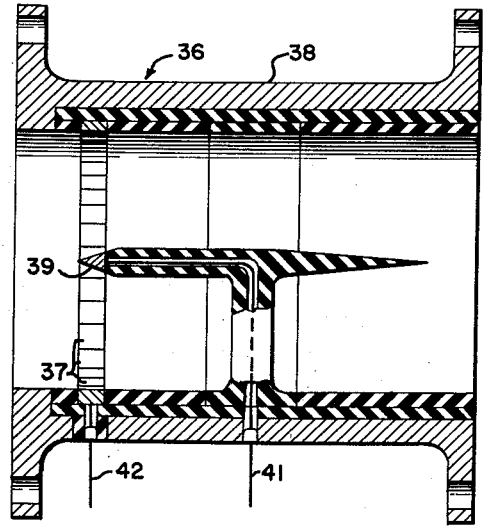
FIG. 6 is a detailed horizontal sectional view taken through a portion of the apparatus shown in FIG. 5, the plane of the section being indicated by the line 6—6 of FIG. 5.
Figure 5:
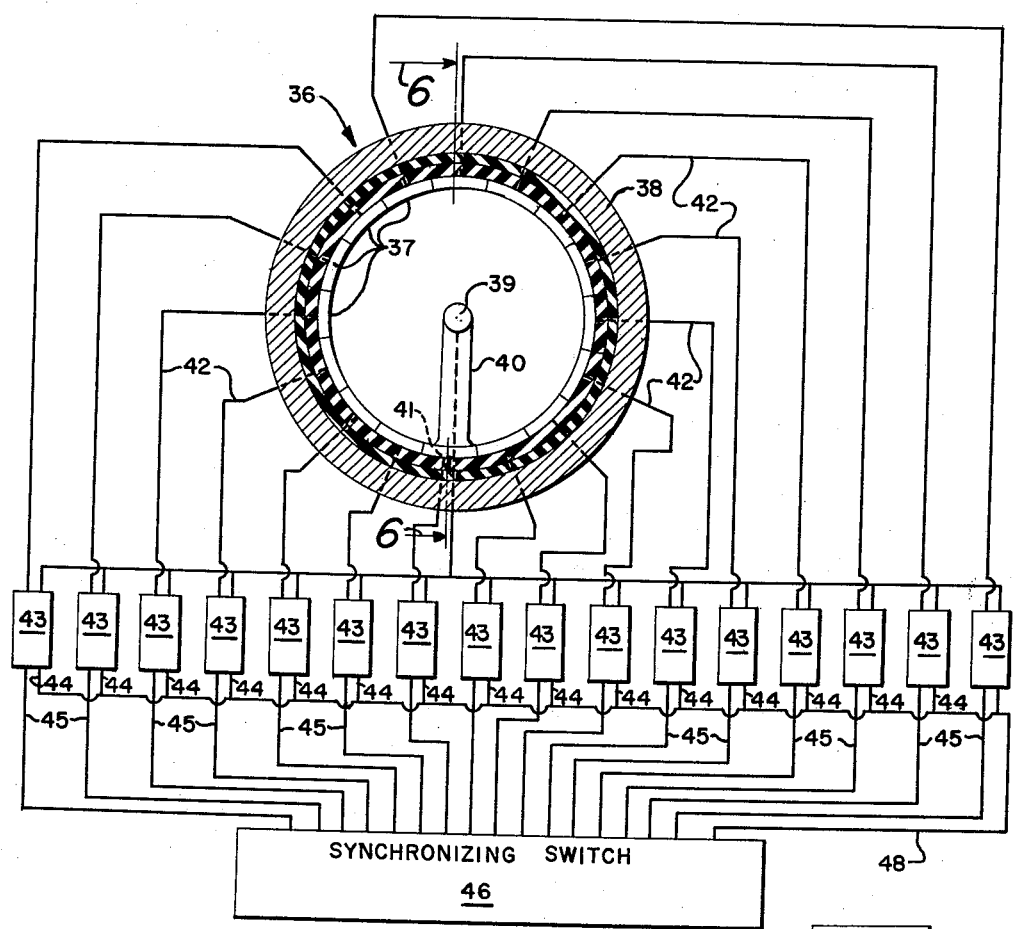
FIG. 5 is a diagrammatic view of another form of apparatus embodying a modified form of the invention.

FIGS. 5 and 6 show a modified form of circuit wherein the grid assembly 36 is provided with a plurality of segmental electrodes 37 embedded in the conduit wall in a manner similar to the electrodes 28 and 33 in FIGS. 3 and 4, respectively. The electrodes 37 are insulated from each other, and are spaced around the inner wall of the section 38 which is to be inserted in a conduit. The grid assembly 36 includes another electrode 39 which is supported in the axial center of the conduit section 38 by a strut 40, and leads 41 and 42 extend from electrodes 39 and 37, respectively, to a plurality of amplifiers 43 connected in parallel in the circuit, the lead 41 extending from electrode 39 being connected with one input lead of each amplifier 43, while the leads extending from individual electrodes 37 are connected to the input leads of different amplifiers 43. The output leads 44 and 45 of the amplifiers are connected with a synchronizing switch 46 of suitable character, which is connected in circuit with a polar scan, or radial sweep, oscilloscope 47. In connecting the amplifiers 43 with the switch 46, the output leads 44 of all the amplifiers are connected to one input lead 48 of the switch. The other output leads 45 of the amplifiers are connected individually to the synchronizing switch. The switch 46 is so designed that it consecutively directs the output of each amplifier into the polar scanning oscilloscope 47 and controls the radial sweep in a manner similar to that utilized in the display units of present radar equipment, whereby the electron beam is swept radially of and around the cathode-ray screen. When bubbles or other anomalies move by the spaced electrodes 37 and 39, their presence, size and location in the cross-section of conduit 38 will be displayed on the oscilloscope screen.

Some of the signals produced in the electrodes by anomalies other than bubbles may require amplification to a higher degree than those resulting from the motion of bubbles. These signals may also be translated into measurable indicia by instruments similar to those illustrated in FIGS. 1 and 5. Other suitable electromotive force measuring equipment may also be used.

Figure 9:
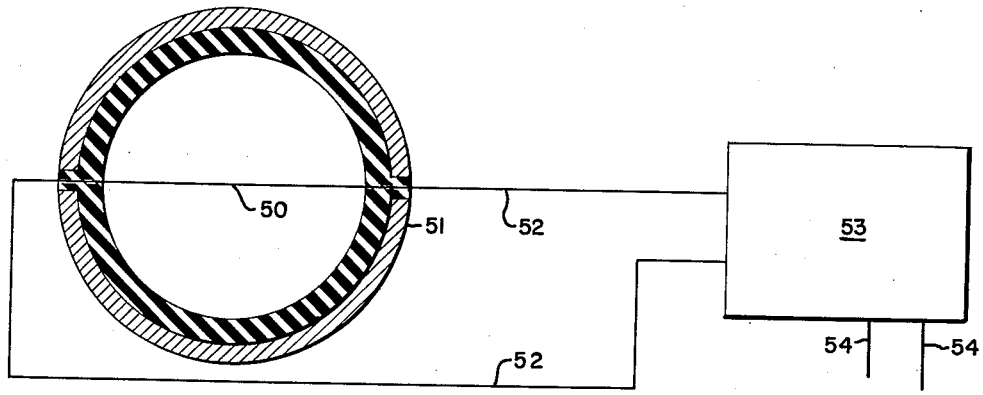
FIGS. 9 and 10 are diagrammatic views of further modified forms of apparatus for practicing the method forming the subject matter of the present invention.

In the form of apparatus shown in FIG. 9, the grid constitutes a conductor 50 which extends across a conduit 51 and is insulated therefrom. The conductor 50 may traverse the conduit as many times and in any pattern as desired, and is connected at its ends by leads 52 to an amplifier 53, as in the first form of the invention. Signal impulses are increased in amplitude in the amplifier 53, and then are transmitted to a translating device which may be of any type previously mentioned and shown in FIG. 1, by leads 54, to be recorded or indicated as desired.

Figure 10:
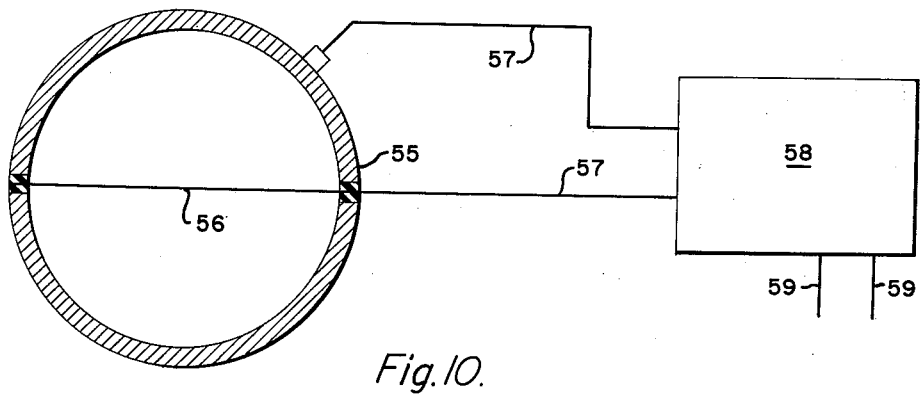

In FIG. 10, the conduit 55 is employed as one element of the grid and a conductor 56 extends across the conduit and is insulated therefrom. Leads 57 extend from the conduit 55 and conductor 56 to an amplifier 58 as in the other forms of apparatus. The amplified signal is conducted from amplifier 58 by leads 59 to a suitable translating device as in the other forms of the apparatus.

The operation of apparatus utilizing the sensors represented in FIGS. 9 and 10 is the same as that described above in connection with the other figures.

It should be noted that unlike devices known in the prior art, the invention appears to operate by the development of an E.M.F. in an electrical conductor, whether or not a portion of the circuit across the input terminals of an amplifier is formed by the fluid itself as in FIGS. 1 through 7 and 10, or whether it is provided by a separate conductor as in FIG. 9.

It should also be noted that if a separate conductor is used as in FIG. 9, it need not be immersed in the fluid as shown in that exemplification, but may be located adjacent the fluid.

It should be obvious that, while a number of forms of apparatus for practicing the method have been illustrated

I claim:

1. Apparatus for detecting the presence of gas bubbles in liquids comprising: grid means formed for incorporation in a fluid conduit, said grid means having current-conductive elements electrically insulated from one another and said conduit and spaced transversely of said fluid conduit to receive an electrical signal produced by the bubble-containing liquid flowing through the conduit; amplifying means connected with said current-conductive elements to increase the magnitude of such signal; and means in circuit with said amplifying means for translating the amplified signal into intelligence.

2. A method of detecting cavitation in liquids comprising flowing the liquid past current-conductive elements disposed in the liquid and spaced transversely of the direction of fluid flow, amplifying variations in potential difference developed between said elements in response, at least, to the passage of cavitations in proximity to the said elements, said elements amplifying said variation, and translating the amplified variations into intelligence.

3. A method of obtaining information about electrically-neutral anomalies like flow irregularities, discontinuities, and impurities in solid, liquid, or gaseous form present in a fluid, and comprising the steps of:

producing relative motion between electrically-neutral anomalies contained in a fluid and an electrically-conductive element in mutually proximate relation to generate electrical signals representing characteristics of the anomalies;

amplifying the generated electrical signal;

and translating the amplified signal into observable information about the anomalies.

4. In a method of obtaining observable information about electrically-neutral anomalies like flow irregularities, discontinuities, and impurities of solid, liquid, or gaseous form present in a fluid, and involving the steps of amplifying and displaying an electrical signal representing the information, a procedure for generating the electrical signal comprising the sole step of:

producing relative motion between an electrical conductor coupled effectively across the input terminals of an amplifier and electrically-neutral anomalies present in the fluid and proximately related, at least, to the conductor.

References Cited in the file of this patent

UNITED STATES PATENTS

| | | |
|---|---|---|
| 2,149,847 | Kolin | Mar. 7, 1939 |
| 2,491,445 | Cunningham et al. | Dec. 13, 1949 |
| 2,492,493 | Misson | Dec. 27, 1949 |
| 2,656,508 | Coulter | Oct. 20, 1953 |
| 2,734,380 | Mittelmann | Feb. 14, 1956 |

OTHER REFERENCES

Journal of Applied Physics, vol. 15, Feb. 1944, pages 150–164. (Copy in Division 36.) 73–194 EM.